INVENTORS
WALTER EMIL WILHELM JACOB
OLAF STERNBECK
CARL GUNNAR SVALA
WOLFRAM ERHARD MAX UHLMANN
BY [signature]
ATTORNEY INVENTORS
WALTER EMIL WILHELM JACOB
OLAF STERNBECK
CARL GUNNAR SVALA
WOLFRAM ERHARD MAX UHLMANN
BY [signature]
ATTORNEY INVENTORS
WALTER EMIL WILHELM JACOB
OLAF STERNBECK
CARL GUNNAR SVALA
WOLFRAM ERHARD MAX UHLMANN
BY [signature]
ATTORNEY 2,888,602
Patented May 26, 1959

1

2,888,602

METHOD FOR READING OF INFORMATION STORED IN ELECTRONIC STORAGE TUBES

Walter Emil Wilhelm Jacob, Hagersten, Olaf Sternbeck and Carl Gunnar Svala, Alvsjo, and Wolfram Erhard Max Uhlmann, Hagersten, Sweden, assignors to Telefonaktiebolaget L M Ericsson, Stockholm, Sweden, a corporation of Sweden Application March 1, 1954, Serial No. 413,322

Claims priority, application Sweden February 27, 1953

5 Claims. (Cl. 315—12)

This invention relates to a method for reading information out of electronic storage tubes, comprising an electron emitting cathode, a control grid, an accelerator grid, secondary electron emitting storage elements, on which information may be stored by means of bringing said elements on suitable potentials, one or more electrodes for collecting the primary electron current and the secondary emission current issuing from the storage elements, all said storage elements being electrically directly accessible from the outside of the valve envelope.

A number of these tubes may with respect to their storage elements be coupled in parallel. It will however, be possible to read out separately the information stored in one tube without affecting the other tubes.

The method according to the invention is mainly characterized by the reading being achieved with the aid of pulses, e.g. in such a manner that the electron current issuing from the cathode is modulated with pulses, which then appear in a certain form on the output terminal of those storage elements which are near the collector potential but not on the output terminal of those elements which are locked to cathode potential. The pulses are preferably shaped in such a manner, that the tube during the intervals between said pulses carries a small current or no current whatever. The duration of said pulses and the interval between them with respect to the circuit elements in the storage element circuit have such values that the marked storage elements during the pulse pauses are not discharged below a certain potential (approximately that value which corresponds to the first 0 point of the secondary emission characteristic of said element reckoned from cathode potential). During the duration of said pulses the electron current is able to bring all storage elements back to their earlier potentials, whereby the charging current appearing in the storage elements is utilized for reading.

The invention will hereinafter be described with reference to the following figures:

Fig. 1, a schematic diagram showing a tube according to the invention.

Fig. 2, current voltage characteristic for a storage element of the type shown in Fig. 1.

For a better understanding of the invention the working of a storage tube as used in the present circuits will be first described.

Figure 1:
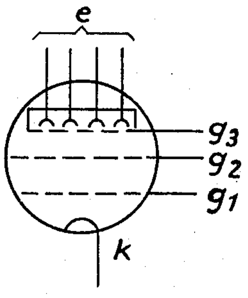
Figure 2:
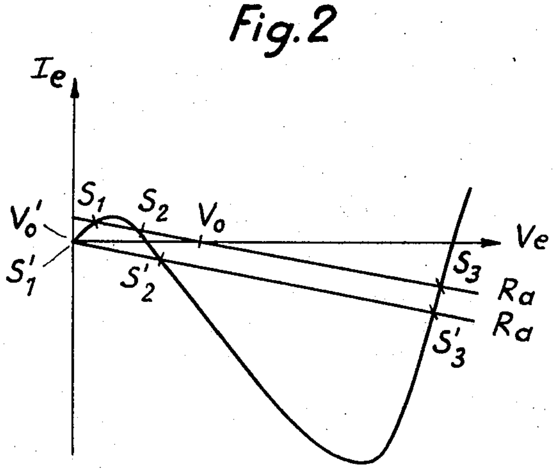

Such a tube contains a hot cathode as electron source and a generally negatively biased control grid, an accelerator grid and a collector grid, behind which in a space enclosed by said collector grid, a number of storage elements are arranged. Fig. 1 shows the tube schematically. The electron current issuing from the cathode $k$ is controlled by the control grid $g_1$, accelerated by the accelerator grid $g_2$ and goes partly directly to the collector grid $g_3$, partly to the space, enclosed by said collector, where, with respect to the storage elements $e$ arranged there, the following happens. As long as these elements are at cathode potential, no electrons can reach them, and the latter return to the collector. As soon as an element receives a positive potential, an electron current will flow towards it, which at the beginning increases with the increasing voltage, then passes a maximum and then decreases afterwards again. At a certain voltage, when the secondary emission coefficient of the element is equal to 1, the current becomes again 0 and assumes above this voltage negative values. After passing a minimum with further increased voltage the current goes again towards and through 0 at a voltage, which is equal to the collector voltage. Fig. 2 shows the characteristic of such a storage element. If an element is connected over a sufficiently high resistance to a suitable voltage $V_0$ in such a manner that the resistance line $Ra$ intersects the element characteristic in three points $S_1$, $S_2$ and $S_3$, two stable points of intersection will be obtained, i.e. $S_1$ and $S_3$. $S_1$ corresponds to the locked or barred state, at which the element potential is near the cathode potential, and $S_3$ to the unlocked state, at which the element potential is near the collector potential. Point $S_2$ in unstable. The two stable points $S_1$ and $S_3$ differ fundamentally. In point $S_1$ the inner resistance of the element in relation to the collector is very high and therefore, a modulation of the collector voltage cannot affect the element. In point $S_3$, on the contrary, the inner resistance of the element in relation to the collector is low and the element can follow the modulation of the collector and deliver an output voltage. In this manner it will be possible to distinguish the unlocked elements in a storage tube and to read out the information stored on these elements.

This method shows, however, certain disadvantages when it is necessary to read out a succession of information from a number of storage tubes, which are coupled in parallel with respect to their storage elements in such a manner, that the elements indicated by the same index have a common output terminal. Should it accidentally be the case that in some tubes the element indicated by the same index is unlocked it will occur that, during the reading process, at a certain tube, the output effect of this element will be damped by the inner resistance between the same element and collector in the other tubes, said resistance acting as a shunt, which fact may have an undesired influence upon the output voltage.

This disadvantage may be avoided by the method according to the present invention. This method is characterized by the fact that normally all storage tubes with exception of that one from which stored information shall be read are blocked. This is achieved suitably by pulsing the tubes periodically in the order they shall be read. A further advantage of the method is that it is possible to obtain a much higher instantaneous output than is already generally known from the pulse technic.

Figure 3:
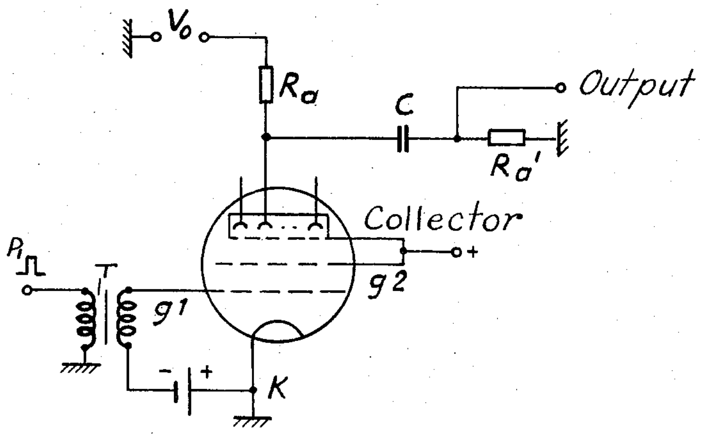
Fig. 3 shows a circuit for connection of a storage tube.

Fig. 3 shows a suitable circuit. Collector and accelerator grid receive a constant positive D.C. voltage. The control grid $g_1$ has a bias, high enough to cut off the tube. This bias is adjusted in such a manner that the valve is completely blocked and only can carry current when positive pulses $p_1$ are fed from the pulse transformer T to the control grid. Fig. 3 also shows the circuit for a storage element. The element receives over a resistor $Ra$ a voltage, which among other purposes serves to bring said element to collector potential in some manner, i.e. to unlock it, which shall not be further discussed here. During the reading process this voltage is below the value corresponding to the first 0 passage of the element characteristic. In the following examples the mentioned voltage has been chosen to $V_0=0$ with respect to the cathode potential.

A second resistance $Ra^1$ is connected through a condenser C to the element, which resistance is common for the corresponding elements of a number of tubes, and over which the output voltages appear. $Ra^1$ is generally considerably smaller than R*a*.

Figure 4:
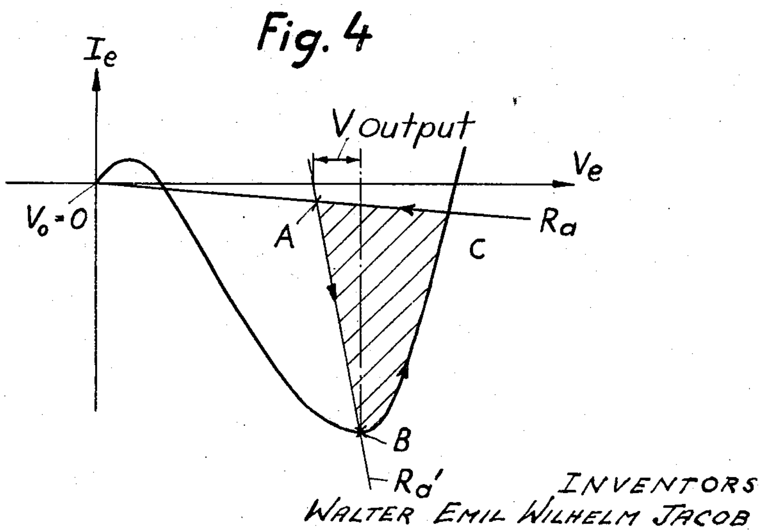
Fig. 4 shows a current voltage characteristic of an element as used in a circuit shown in Fig. 3.

To explain the reading process it shall be assumed that the unlocked element and therewith the condenser C are at collector potential at the end of a current pulse (approximately point C in Fig. 4, the point of intersection of the element characteristic and the resistance line R*a*). By pulse interruption and when the valve current is cut off, the condenser will be discharged over the resistance R*a*. The voltage of the condenser and therewith the potential of the element drops along the resistance line R*a* and would after a certain time reach 0, if not the valve current would return approximately when the condenser voltage has reached the point A.

If the leading edge of the primary current pulse is sufficiently steep, the capacitive resistance of the condenser C may be neglected for the first moment; thus the outer resistance resulting alone from R*a* and R*a'* coupled in parallel, i.e. its magnitude is mainly equal to R*a'* as $Ra \gg Ra'$. The element assumes therefore at once the potential which corresponds to the point of intersection between the resistance line R*a'* and the element characteristic corresponding to point B in Fig. 4. The value of the output voltage appearing over the reistor R*a'* is $I_e \times Ra'$. During the further duration of the current pulse the condenser C is charged again and the element voltage increases along the element characteristic back to the starting point C. After the end of the current pulse the cycle is repeated.

The following two conditions have to be fulfilled in designing the element circuit.

(1) Point A has to be on the part of the element characteristic where the current is negative so that the stored information is not lost, i.e. the relation between the pulse interval and the time constant R*a*.C must not exceed a certain value.

(2) The charge flowing to the element during the current pulse must be so great that the charge which flows away from the condenser C over the resistance R*a* during the pulse interval is fully replaced during the pulse duration, i.e. with a given element characteristic and a given R*a*.C the pulse duration must not be shorter than a certain value. In order to obtain the highest possible output pulse the position of point A is suitably chosen in such a manner, that the point of intersection between R*a'* and the *e*-element characteristic is in the minimum of said characteristic.

The size of the output pulse for a certain value R*a'* is defined by the minimum of the element characteristic which again depends on the space current in such a manner, that, with increasing space current the element characteristic expands to higher current values. It will therefore be advantageous to utilize the properties of pulse operation in a suitable manner and run the tube current during the pulse into the control grid current range.

It is however not necessary to have such a high current during the whole duration of the pulse. Considering a number of element characteristics with the space current as parameter it is apparent that all curves intersect at the collector potential, i.e. near the point C. This means that it is of no avail along which of the element characteristics the point C is finally reached, and it is suitable to increase the current as much as possible only at the leading edge of the current pulse. Therefore it will not be advisable to feed rectangular pulses to the control grid but pulses which have a peak at the leading edge. In this way the loading of the grid circuit may be kept low.

Figure 6:
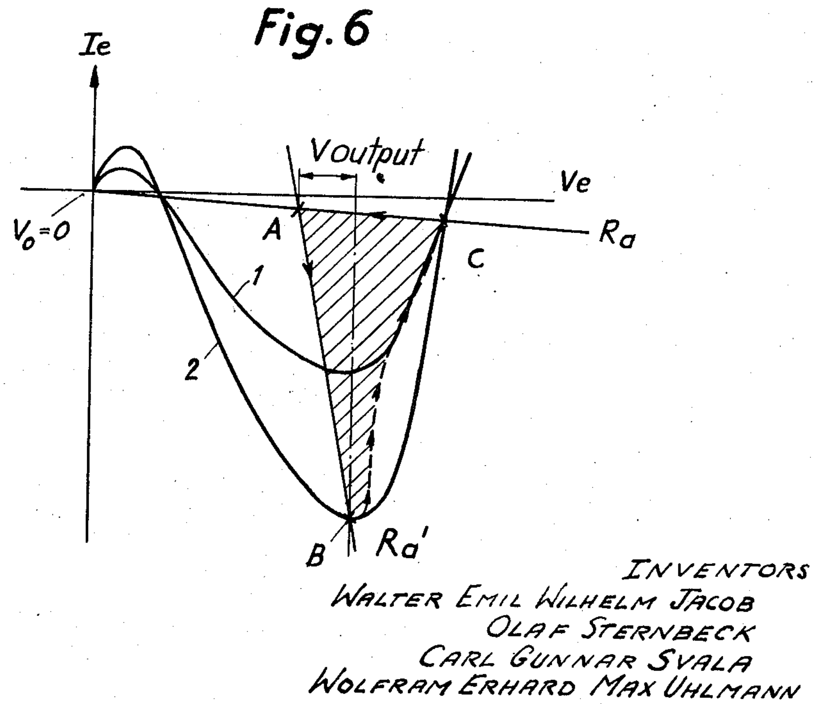
Fig. 6 shows a current voltage characteristic for a storage circuit.

Fig. 6 shows this in a diagram. Two element characteristics are shown. Curve 1 corresponds to the normal case with normal space current. Curve 2 however, corresponds to the increased space current at the leading edge of the pulse. Between these two curves a number of characteristics for all the other intermediate values can be drawn. At the beginning of the pulse the element will jump from point A to point B on curve 2 and at the output resistor the corresponding voltage pulse will appear. During the charging of the condenser C the valve current pulse will slowly return to the value for which the element characteristic 1 is valid. The valve current pulse is caused by the pulse applied to the grid of the valve from the grid pulse transformer. The element voltage will return from point B on a suitable way along the imagined lines of the curves—approximately corresponding to the line of short dashes—to curve 1 and finally to point C.

Figure 5:
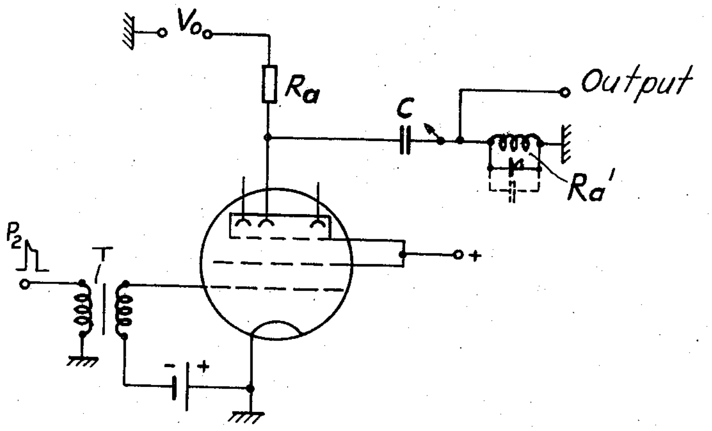
Fig. 5 shows a modified circuit arrangement for a storage tube.

Fig. 5, which mainly corresponds to Fig. 3, shows at the grid pulse transformer T the mentioned pulse shape $P_2$ with a peak at the leading edge. Furthermore the outer resistance R*a'* is represented by an inductance, which with its own winding capacitance constitutes an oscillator circuit. A suitably connected shunting diode causes that only the first positive half period of the oscillation of the circuit appears at the output terminal. The last design shows a circuit which is advantageously used for reading periodically information out of a number of storage tubes connected in parallel.

We claim:

1. A circuit system for reading out information stored in an electronic storage tube, said system comprising a storage tube having a cathode emitting a primary electron current, a control grid, secondary electron emitting storage elements adapted to store information in response to the application of potentials to the storage elements and individually connected for direct electric accessibility, an accelerator grid for effecting a simultaneous and equal electron bombardment of all the secondary electron emitting elements with primary electrons, at least one electrode for collecting the primary electron current from the cathode and the secondary emission current emanating from said storage elements, circuit means connected between the storage elements and the cathode for applying information storage potentials having a potential with reference to the cathode potential so as to bring some of said storage elements close to the potential of the cathode and the others approximately to the potential of said collector electrode, the storage elements at approximately collector potential storing information and the other storage elements being locked to the cathode potential, means for pulse modulating the primary electron current emanating from the cathode so that the tube is conducting during the duration of said pulses only, said pulse modulating means comprising a pulse transformer connected to the control grid of the tube for feeding to said grid a train of regularly spaced voltage pulses, said pulses appearing at the storage elements at approximately the potential of the collector electrode, and a circuit means for reading out information from each of the storage elements.

2. A circuit system for reading out information stored in an electronic storage tube, said system comprising a storage tube having a cathode emitting a primary electron current, a control grid, secondary electron emitting storage elements adapted to store information in response to the application of potentials to the storage elements and individually connected for direct electric accessibility, an accelerator grid for effecting a simultaneous and equal electron bombardment of all the secondary electron emitting elements with primary electrons, at least one electrode for collecting the primary electron current from the cathode and the secondary emission current emanating from said storage elements, circuit means connected between the storage elements and the cathode for applying information storage potentials having a potential with reference to the cathode potential so as to bring some of said storage elements close to the potential of the cathode and the others approximately to the potential of said collector electrode, the storage elements at approximately collector potential storing information and the other storage elements being locked to the cathode potential, means for pulse modulating the primary electron current emanating from the cathode so that the tube is conducting during the duration of said pulses only, said pulse modulating means comprising a pulse transformer connected to the control grid of the tube for feeding to said grid a train of regularly spaced voltage pulses, said pulses appearing at the storage elements at approximately the potential of the collector electrode, and a circuit means for reading out information from each of the storage elements, each of said read-out circuit means comprising capacitance means connected to the respective storage element and to ground, said ground connection including impedance means, the output obtained at the connection point between the capacitance means and the impedance means being the read-out current.

3. A circuit system according to claim 2, wherein said impedance means is a resistance means.

4. A circuit system according to claim 2, wherein said impedance means is an inductance means constituting with its own coil capacitance an oscillator circuit.

5. A circuit system according to claim 4, wherein a diode is connected in shunt with said inductance means, said diode passing the first positive half period of the oscillation as read-out output.

References Cited in the file of this patent

UNITED STATES PATENTS

| | | |
|---|---|---|
| 2,452,157 | Sears | Oct. 26, 1948 |
| 2,547,386 | Gray | Apr. 3, 1951 |
| 2,576,040 | Pierce at al. | Nov. 20, 1951 |
| 2,604,606 | Rajchman | July 22, 1952 |